United States Patent [19]

Fink

[11] 3,915,696

[45] Oct. 28, 1975

[54] SINTERED PREFORMED SLAG FOR THE STEEL INDUSTRY

[76] Inventor: Ferdinand Fink, Feldbergstrasse 57, 6374 Steinbach, Taunus, Germany

[22] Filed: Nov. 6, 1973

[21] Appl. No.: 413,352

Related U.S. Application Data

[63] Continuation of Ser. No. 102,562, Dec. 26, 1970, abandoned.

[30] Foreign Application Priority Data

Jan. 8, 1970 Germany.............................. 200073

[52] U.S. Cl. ............................ 75/94; 75/30; 264/56
[51] Int. Cl.² ............................................ C22B 9/10
[58] Field of Search ............................ 75/30, 53–58, 75/94; 264/56

[56] References Cited
UNITED STATES PATENTS

| | | | |
|---|---|---|---|
| 3,288,592 | 11/1966 | Tadsen et al. ........................... | 75/30 |
| 3,309,196 | 3/1967 | Kaneko et al. ........................... | 75/94 |
| 3,645,719 | 2/1972 | Minnick .................................. | 75/55 |
| 3,669,618 | 6/1972 | Cappel ................................... | 75/94 |
| 3,751,241 | 8/1973 | Sloughfy et al. ......................... | 75/94 |
| 3,771,999 | 11/1973 | Fedock et al. ........................... | 75/94 |

*Primary Examiner*—C. Lovell
*Assistant Examiner*—M. J. Andrews
*Attorney, Agent, or Firm*—Irons & Sears

[57] ABSTRACT

Sintered preformed slag for the steel production on the basis of CaO-(Al$_2$O$_3$ and Fe$_2$O$_3$)-MgO and comprising occasionally also SiO$_2$, TiO$_2$, Na$_2$O individually or in combination, which is highly reactive and which attacks basic refractory linings of metallurgical vessels only to a small extent.

7 Claims, No Drawings

SINTERED PREFORMED SLAG FOR THE STEEL INDUSTRY

BENEFIT OF PRIOR APPLICATION

This application is a continuation of application Ser. No. 102,562 filed Dec. 29 1970 now abandoned.

The present invention relates to sintered performed slags, and concerns more particularly those slags which are metallurgically very active and which attack only little the basic refractory materiels, such as dolomite, magnesite etc., e.g. in the LDLDAC-Kaldo-process, whereby shorter tap to tap times and longer lining life are obtained.

Present steel processes are designed for short tap to tap time and still shorter times are striven for, thereby raising problems of slow slag formation.

It is well known that slag is formed with additives, oxidized components from metal and oxidized iron, brought together as heating progresses. The first slag is acid, and thereafter it becomes progressively more basic due to lime solution-reaching full metallurgical reactivity at the end of the operation.

The main additive is lime, the reactivity of which essentially influences the rate of slag formation, soft burned lime being more reactive than hard burned lime. Dicalcium silicate is formed from both hard and soft burned lime and silica, which dissolves slowly in the slag. At this progresses, the remaining, unreacted lime becomes hard burned in a few minutes-thus its ability to enter solution is reduced. This solubility is aided by the addition of fluxes, which offset the decrease in solubility caused by the dicalcium silicate formation.

Calcium fluoride is a popular flux addition in the LD Process, but it has the disadvantage that it strongly attacks the refractory lining and produces fluorine-rich waste gases.

Iron ore is also a useful flux but its usage increases slag volume. Occasionally alumina-bearing flux material is used (e.q. bauxite), and this works especially well when added simultaneously with a portion of lime.

This flux material certainly accelerates slag formation, while promoting lime solution, nevertheless some length of time is occupied in slag formation. To reduce the blowing time one must decrease the time required for slag formation - thus causing the metallurgical reactions to set in earlier and proceed more quickly.

Considerations of the above produces a major simplification, for instead of several components only one need be used, i.e. previously made up slag.

Preformed slags were proposed occasionally before the invention of the LD-process, but their use was not extended because in the slow refining processes (e.g. O.H., furnace, electric arc-furnace) no increased efficiency resulted.

One exception to this is the "Perrin" slag process, which however, applies to the refining of steel outside the furnace (e.g. in ladles).

Slags are metallurgically more effective if they contain more reactive "free" lime - therefore performed slag should have a higher content of flux material than silica, i.e. the proportion of flux to silica must be as high as possible in order to make sure that the slag is liquid at steel making temperatures.

In the following considerations, calcium fluoride is not included, and the slag is primarily lime-rich with $Al_2O_3$ and/or $Fe_2O_3$. This is metallurgically very active, but strongly attacks dolomite and magnesite. It has been found that this aluminate/ferrite slag attacks basic linings less severely when 8-15 contains 8-15 percent MgO. Such an aluminate slag has the following analysis:

$CaO = 50\text{-}55\%$ by wt.

$Al_2O_3 = 27\text{-}39\%$ by wt.

$MgO = 8\text{-}15\%$ by wt.

This slag can be used with advantage for refining, but for the oxidizing period it is necessary to have iron oxide in the slag. Therefore in this case the aforementioned $Al_2O_3$ can be partially or wholly replaced by $Fe_2O_3$ in the preformed slag.

However, in all the previously mentioned slags we must adhere to the following two proportions:

$$\frac{MgO}{Al_2O_3 + Fe_2O_3} = \frac{1}{2.5 - 4.0}$$

These proportions strongly retard the slag attack on dolomite and magnesite.

$$\frac{CaO}{Al_2O_3 + Fe_2O_3} = 1.5 - 2.0$$

These proportions ensure a metallurgically very active good fluxing slag which nevertheless only slowly dissolves the lime of the dolomite. To obtain silica-free slag is expensive, and the most useful raw materials contain some silica, but one can allow some silica in the slag without harming the metallurgical process.

According to the invention, the performed slag must contain not more than 10 percent by weight of $SiO_2$ in order that additional $SiO_2$ can be taken up from the bath without reducing too much of the metallurgical activity of the slag. Such a slag can be produced for example from limestone, dolomite and bauxite, where none of the raw materials need be pure. Instead of bauxite, red mud from the aluminum industry can be used, in which case appreciable amounts of $TiO_2$ and $Na_2O$ are added. According to the invention, the amounts of these oxides must not exceed 6 percent by weight each.

In the present, conventional steel making slag, 8–15% by weight of MgO is abnormal, for example in the LD process 1.1–3.7% 3.7% by weight of MgO is found, these minor accounts being dissolved into the slag, primarily from the dolomite and magnesite lining. The opinion that small contents of MgO in conventional steel making slags retard the attack on the furnace lining is not yet generally accepted. The intentional addition of MgO for instance in the form of mildly burned dolomite is used only in a few steel mills. However, in these cases the MgO content of the end slag is rarely more than 4 percent by weight. This or even higher MgO contents act as a flux in the lime-deficient first slags of the present steel making process. Nevertheless, the lime saturation of this slag is impeded because additional lime favors the formation of dicalcium silicate in the liquid slag. Due to the addition of MgO one obtains better lining stability while the slag is metallurgically less active. This statement applies only to the conventional slag which is essentially composed of:

$$CaD - SiO_2 - FeO$$

Generally speaking, with aluminate slag of little or no silica content, the MgO content according to this invention can be increased to 8–15 percent by weight, without reducing the metallurgical activity of the slag.

The proposed preformed slag can be formed by a melting or sintering process, the latter of which is economically more advantageous.

EXAMPLE 1

Iron-rich raw bauxite, limestone and raw dolomite are ground to less than 0.15 mm, dried and thereafter the raw powder is sintered in a rotary kiln, the mixture being:

| | | |
|---|---|---|
| Limestone : | 620 kg/tons | 35 % |
| Raw Dolomite : | 560 kg/tons | 31 % |
| Raw Bauxite : | 600 kg/tons | 34 % |
| | 1,780 kg/tons | 100 % |

This batch of dried raw material is calcined around 1150°C to produce approximately 1,000 kg of preformed slag as a sintered clinker, the composition being:

| | |
|---|---|
| CaO : | 48 % by wt. |
| $Al_2O_3/Fe_2O_3$: | 36 % by wt. |
| MgO : | 11 % by wt. |
| $SiO_2$: | 4 % by wt. |
| $TiO_2$ : | 1 % by wt. |

EXAMPLE 2

According to the invention, preformed slag can also be produced from waste products (e.g. of the steel industry).

Red mud from the aluminum industry is mixed and ground in the wet state together with crushed dolomite from the steel mills and with limestone, yielding the following mud (in the dried state):

| | | |
|---|---|---|
| Limestone : | 560 kg/tons | 43.5 % |
| Crushed Dolomite : | 230 kg/tons | 17.8 % |
| Red Mud : | 500 kg/tons | 38.7 % |
| | 1,290 kg/tons | 100 % |

The 1.29o kg of dried mud yields approximately 1,000 kg. of sintered clinker burned in a continuous rotary kiln, as in the wet process for cement production temperature equals ca. 115o°C. The following is the composition of this type of slag.:

| | | |
|---|---|---|
| CaO : | 46 | % |
| MgO : | 11 | % |
| $Al_2O_3/Fe_2O_3$ : | 26.5 | % |
| $SiO_2$ : | 8 | % |
| $TiO_2$ : | 3 | % |
| $Na_2O$ : | 5.5 | % |

In addition to calcining the slag in a rotary kiln, the burning can be done in a shaft furnace or on a sinter strand.

This invention of preformed slag provides a number of advantages to the steel making process.

For the preparation of the synthetic slag "impure" raw materials, which seldom find a market, e.g. Marly limestone and dolomite, iron-rich bauxite, crushed dolomite and red-mud etc. can be used. Some of these materials are normally even regarded as a troublesome waste product.

The preparation of such a slag including the burning is much simpler than the soft burning of steel mill lime. The storage of sintered preformed slag is also easy in comparison with steel mill lime. The sinter contains little or no "free" lime and thus is not prone to hydration.

After charging, the preformed slag quickly melts and is immediately metallurgically very active. During operation of the charge the slag absorbs the oxidized impurities from the metal bath and reduces the interactions between impurities and the bath, without losing too much of its metallurgical effectiveness.

The de-sulphurizing effect of the slag according to the invention is very good and remains so even after picking up the oxides from the metal obtained during oxygen blowing.

A further metallurgical advantage of the slag is that it is not blown out of the converter with high oxygen lance velocities, thus the duration tap to tap can be shortened without detrimental effect on the stability of the process.

In addition to these advantages the lining life is increased. This brings about, together with the shortened tap to tap time, a considerable extension of furnace life (the campaign).

What is claimed is:

1. A sintered preformed slag for producing steel comprising CaO, from about 8 to about 15 percent by weight of MgO based on the weight of said slag, and a third ingredient selected from the goup consisting of $Al_2O_3Fe_2O_3$ and mixtures thereof, the weight of said third ingredient being from about 2.5 to about 4.0 times the weight of said MgO and the weight of said CaO being from about 1.5 to about 2.0 times the weight of said third ingredient.

2. The slag of claim 1, wherein said CaO comprises from about 50 to about 55 percent of the weight of said composition.

3. The slag of claim 1, wherein said third ingredient comprises from about 27 to about 39 percent of the weight of said composition.

4. The slag of claim 1, wherein said composition additionally contains from O to about 10 percent by weight $SiO_2$, from 0 to about 6% by weight $TiO_2$, and from O to about 6 percent by weight $Na_2O$.

5. The slag of claim 1, wherein said ingredient is $Al_2O_3$.

6. The slag of claim 1, wherein said ingredient is $Fe_2O_3$.

7. A method of preparing a sintered preformed slag comprising mixing red mud, dolomite, and limestone, and then sintering the mixture, said red mud, dolomite and limestone being mixed in sufficient amounts to produce a slag comprising CaO, from about 8 to about 15 percent by weight of MgO based on the weight of said slag, and a third ingredient selected from the group consisting of $Al_2O_3$, $Fe_2O_3$ and mixtures thereof, the weight of said third ingredient being from about 2.5 to about 4.0 times the weight of said MgO and the weight of said CaO being from about 1.5 to about 2.0 times the weight of said third ingredient.

* * * * *